Figure 1:
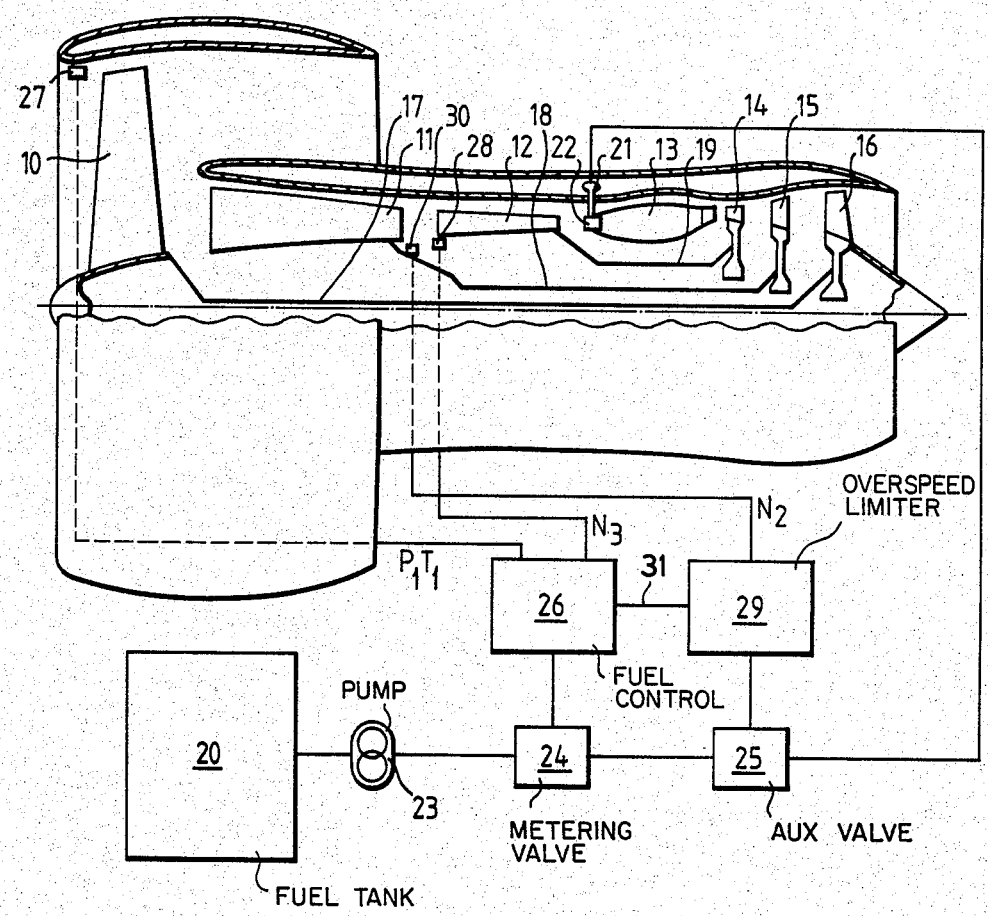

United States Patent [19]

Cantwell

[11] Patent Number: 4,528,812
[45] Date of Patent: Jul. 16, 1985

[54] FUEL CONTROL SYSTEM FOR A GAS TURBINE ENGINE

[75] Inventor: Hugh F. Cantwell, Derby, England

[73] Assignee: Rolls-Royce Limited, London, England

[21] Appl. No.: 513,861

[22] Filed: Jul. 14, 1983

[30] Foreign Application Priority Data

Jul. 27, 1982 [GB] United Kingdom ............... 8221729

[51] Int. Cl.³ .............................................. F02C 9/28
[52] U.S. Cl. ............................................... 60/39.281
[58] Field of Search .......................... 60/39.281, 243

[56] References Cited

U.S. PATENT DOCUMENTS 4,218,879 8/1980 Hagrman et al. ............... 60/39.281
4,248,040 2/1981 Kast ................................. 60/39.281
4,397,148 8/1983 Stockton et al. ..................... 60/243

Primary Examiner—Louis J. Casaregola
Attorney, Agent, or Firm—Cushman, Darby & Cushman

[57] ABSTRACT

A fuel control system for a gas turbine engine comprises a main fuel controller and an overspeed limiter arranged to prevent overspeed of the engine in the case of a fault in the main controller. To ensure that the limiter is tested regularly, the logic capacity of the main controller (which is preferably a digital electronic unit) is used to vary the parameters of the limiter each time the engine is started up. This variation is such as to cause the limiter to operate and produce an observable reduction in the engine speed which is detected by the main controller and uses as an indication of correct limiter operation.

7 Claims, 2 Drawing Figures

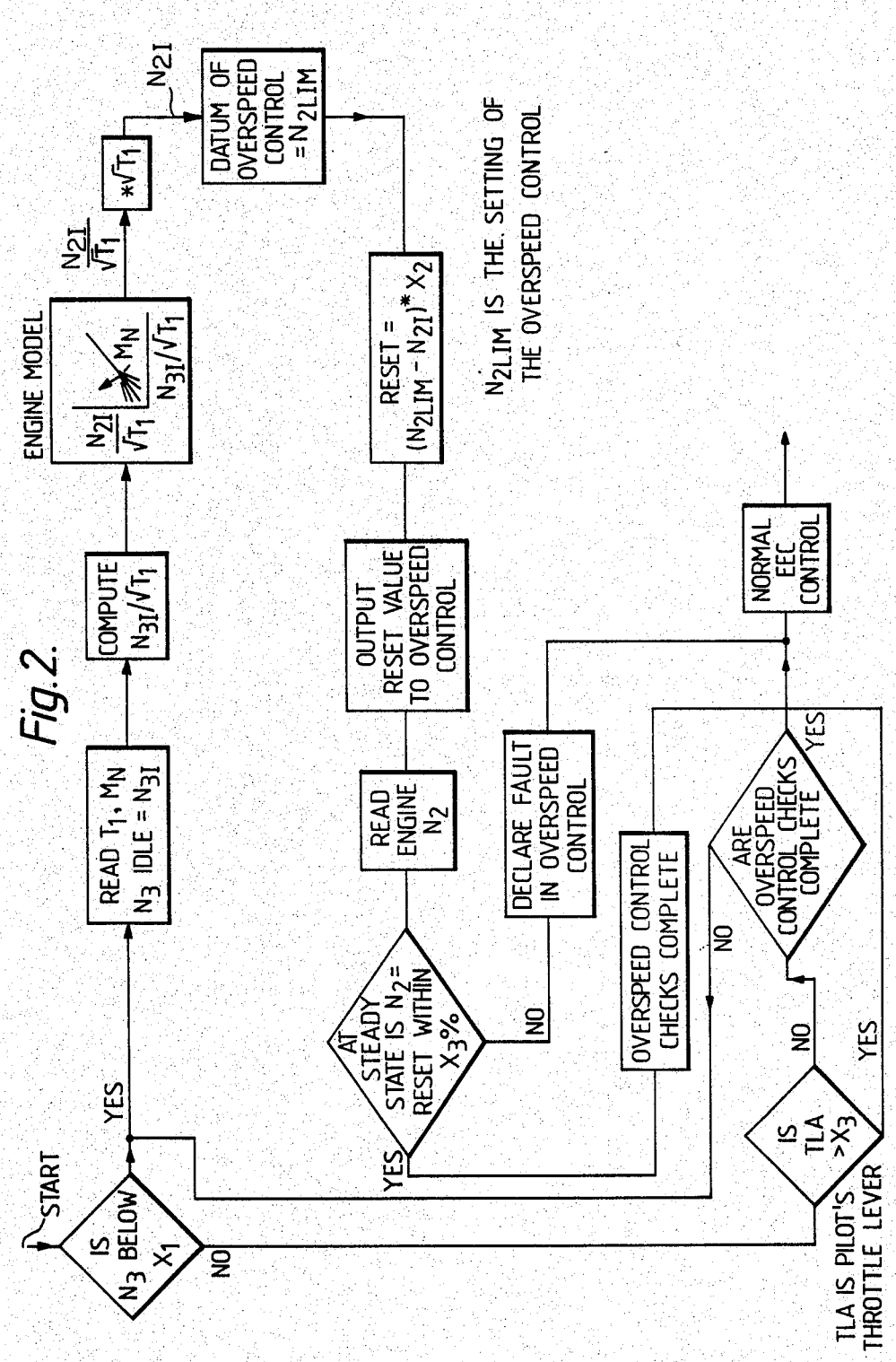

FUEL CONTROL SYSTEM FOR A GAS TURBINE ENGINE

This invention relates to a fuel control system for gas turbine engine.

It is common for such fuel control systems to include a main fuel controller, which performs the control of fuel flow under normal operating conditions, and a separate overspeed limiter. The function of the overspeed limiter is to provide an independent control which will act upon the fuel flow to the engine to prevent a particular parameter of the engine from exceeding a predetermined limit. The parameter used will normally comprise the rotational speed of one of the spools of the engine.

In this way it is intended to provide a high degree of safety, since should the complex and therefore less reliable main controller fail, the simpler and more reliable overspeed limiter will prevent any run-away overspeeding of the engine. It will however be appreciated that the absolute reliability of the main controller is likely to be very high, and therefore the overspeed limiter will be inoperative for most of the time. This leads to the possibility that the limiter may in fact have already failed when called upon to operate.

To preclude this happening, it has been the practice to include regular checks of the limiter in the normal maintenance of the fuel control system. However, any maintenance burden is undesirable and increases overall costs, and in this instance the omission, by accident or design of such an inspection, would not be detected until too late.

The present invention therefore provides a fuel control system in which the computing capacity of the main fuel control unit is used periodically to check operation of the overspeed limiter.

According to the present invention, a fuel system for a gas turbine engine comprises a main fuel control unit and an overspeed limiter. The overspeed limiter is arranged to reduce the fuel flow to the engine should the value of a predetermined engine parameter exceed a predetermined limit. The main fuel control unit is arranged periodically to test operation of the overspeed limiter by causing the valve of the parameter input to the limiter to be above the limit set within the limiter so that the overspeed limiter, if no fault is present, is caused to act to reduce the fuel flow to the engine and to produce an observable reduction in the speed of at least one rotor of the engine.

The test may be carried out either by temporarily resetting the limit in the limiter or by presenting to the limiter a false value of the parameter.

Preferably, the main fuel control unit is arranged to test operation of the overspeed limiter each time the engine is started up.

In a preferred embodiment the main fuel control unit is of the digital electronic type, and the logic circuits of the main fuel control unit are programmed to carry out the tests of the overspeed limiter.

The main fuel control unit may conveniently be provided with means for determining an approximate value of the predetermined engine parameter in accordance with the prevailing ambient conditions.

The invention will now be particularly described, merely by way of example, with reference to the accompanying drawings in which:

FIG. 1 is a partly cut-away view of a gas turbine engine having a fuel system in accordance with the present invention, and FIG. 2 is a flow chart of the programming of the fuel system in FIG. 1.

In FIG. 1 there is shown in broad outline a gas turbine engine comprising a fan 10, intermediate and high pressure compressors 11 and 12 respectively, a combustion system 13, and high, intermediate and low pressure turbines 14, 15 and 16 respectively. The fan 10 and intermediate and high pressure compressors 11 and 12 are connected by respective shafts 17, 18 and 19 to the low, intermediate and high pressure turbines respectively to form three independently rotating assemblies or spools. The engine will be recognised as the conventional three-shaft front fan type and its operation will not be further elaborated.

The basic source of energy for the engine comprises combustible fuel, which is supplied from a tank 20 to a manifold 21 and thence to fuel injectors 22 to be atomised and injected into the combustion chamber 13 to be burnt. Fuel flow is caused by a pump 23 and is controlled by a main fuel metering valve 24 and an auxiliary fuel metering valve 25 in series in the fuel duct between the pump 23 and manifold 21.

The main fuel metering valve 24 is actuated by a main fuel control unit 26 in accordance with various engine parameters. In the illustrated embodiment a combined sensor 27 mounted adjacent the fan 10 provides signals representative of the inlet pressure and temperature $P_1$ and $T_1$ to the unit 26, while a speed sensor 28 provides a signal representative of the rotational speed $N_3$ of the high pressure spool of the engine. The fuel control unit 26 comprises, in the present instance, a digital electronic computing device which calculates, from the values of the various parameters input to it, the correct fuel flow to the engine. It then adjusts the main metering valve 24 accordingly, and a feedback of the change in parameters closes the loop of the system.

The main fuel control unit 26 and its various sensors 27 and 28 are made to be of very high reliability, however it is not possible to make a system which will never fail. A failure which reduces the fuel flow to the engine is not, itself, directly liable to cause damage to the engine or the aircraft which it powers. However, a failure which allowed a large flow of fuel to the engine could conceivably cause the engine to overspeed and possibly to damage itself and the aircraft which it powers. It is usual, therefore, to provide an overspeed limiter which acts independently to prevent such a runaway of the engine.

In the present instance the overspeed limiter 29 is provided with a signal from a transducer 30 which is representative of the rotational speed, $N_2$, of the intermediate pressure spool of the engine. It is arranged to be quiescent as long as the value of $N_2$ remains below a predetermined limit, but should $N_2$ exceed this limit the limiter 29 will operate to close or partially close the auxiliary fuel metering valve 25 to reduce the fuel flow to the engine and to bring the speed $N_2$, and hence the speeds of the other spools of the engine, back within safe limits.

Because of the high level of reliability of the main fuel control unit 26, the overspeed limiter 29 is seldom called upon to operate. There is therefore a danger that the overspeed limiter 29 could itself have failed at some time during its quiescent period, and that when called upon to operate it would be ineffective. It has been the practice in the past to test the limiter at regular intervals as part of the normal maintenance procedure of the aircraft. This adds to the cost of ownership of the engine and is generally undesirable.

In the present embodiment the computing capacity of the main fuel control unit 26 is used to provide an automatic check of the operation of the limiter 29 each time the engine is started. To this end the two devices are interconnected by a signal line 31 through which the control unit is enabled to send a signal which will reset the predetermined limit of $N_2$ above which the limiter operates. The programming of the main control unit (normally incorporated in read-only memories in the unit) is also modified as shown on the flow sheet of FIG. 2.

The sequence of operations implied by the programming set out on the flow sheet is as follows:- Once the engine has fired the unit determines from the input from transducer 28 whether $N_3$, the rotational speed of the high pressure spool, is below $X_1$ where $X_1$ is a speed slightly below the predetermined idle speed. If it is below this speed, the unit uses its input of temperature and its inbuilt value for the idle speed of the high pressure spool $N_{3I}$ to calculate the non-dimensional parameter $N_{3I}/\sqrt{T_1}$. From this parameter it uses an engine model and a calculated value of the Mach number of the aircraft ($M_N$) to determine the corresponding non-dimensional parameter for the intermediate pressure spool at idle, $N_{2I}/\infty T_1$, and hence the idle speed $N_{2I}$ for this spool.

Again using an inbuilt value for the limiting value $N_{2LIM}$ of the parameter controlling the limiter, the unit calculates $(N_{2LIM}-N_{2I}) \times X_2$ where $X_2$ is a factor a few percent greater than unity. This provides a reset factor, which is passed along the signal line 31 to the limiter 29, there it reduces the limit setting of the parameter $N_2$ by the value of the reset factor, causing the new limit setting to become $$N_{2LIM} - (N_{2LIM} - N_{2I}) \times X_2 = N_{2LIM}(1 - X_2) + N_{2I} \times X_2$$

Since $N_{2LIM}$ is greater than $N_{2I}$, this setting is a few percent less than $N_{2I}$. When the engine runs up towards its normal idle speed, it exceeds this limit and should cause the overspeed limiter to operate to maintain $N_2$ at its reset limit value of a few percent less than $N_{2I}$. Once the engine has settled to a steady state condition, the unit checks the value of $N_2$ by means of the output from the transducer 30.

If this value of $N_2$ is within a predetermined error $X_3\%$ of the new reset speed, this shows that the limiter has operated satisfactorily and the unit set an internal marker to show that this check is complete and returns to the normal fuel control operation.

If the value of $N_2$ is not within this error range, the limiter may be taken to be defective, and the unit will declare a fault in the limiter and will return to the normal control mode.

Some additional features are provided to cater for the case where it is necessary to accelerate the engine quickly at start-up through the idle speed and up to a higher speed. If this occurs, at some point the logic detects that $N_3$ is no longer less than $X_1$. It then checks whether the pilots throttle lever is advanced beyond the ground idle setting (this is shown as TLA = throttle lever angle in the drawing). If it is, then all is well and the system reverts to normal control of the engine.

If the throttle lever angle is not advanced beyond the idle speed, the unit first determines whether the check of the overspeed limiter is complete. If it is, all is well and it again reverts to normal control. If it is not, it reverts to the beginning of the check sequence to repeat the sequence of operations.

In this way, the fuel control unit 26 is enabled to check the operation of the limiter each time the engine is started, while not interfering with the normal control of the engine and and also enabling a rapid acceleration through idle to a higher speed to be carried out if necessary. It will be appreciated that the realisation of the flow chart of FIG. 2 into software or firmware is a matter well within the purview of one skilled in the art.

There are of course various ways in which the system described above could be modified while still retaining the inventive feature. Thus for instance instead of resetting the limit value at which the limiter 29 operates, it would be possible to feed in a false $N_2$ signal instead. It will also be noted that although described above in relation to a three-shaft engine in which $N_2$ is the overspeed parameter and $N_3$ the normal control parameter, the invention is applicable to the types of engines using other control and/or limiting parameters.

I claim:

1. A fuel control system for a gas turbine engine comprising:
    transducer means for generating a signal corresponding to a value related to the thrust of the engine;
    a main fuel control including computing means connected to receive said thrust related signal and to generate a first control signal representative of the fuel required in said engine and a second limiter control signal;
    an overspeed limiter connected to receive said thrust related signal and connected to receive said second limiter control signal, said overspeed limiter having means for producing an overspeed control signal in response to said thrust related signal; and
    fuel control means for reducing the fuel flow in response to said overspeed control signal to prevent excessive oversupply of fuel to said engine in the event of failure of said main fuel control; said overspeed limiter being adapted to produce said overspeed control signal upon receipt of said speed limiter control signal, said computing means including means for periodically generating said second limiter control signal and for determining in response to the variation of said thrust related signal whether said overspeed limiter is operating in response to said second limiter control signal.

2. A fuel control system as claimed in claim 1 and in which the computing device comprises a digital electronic device.

3. A fuel control system as claimed in claim 1 and in which said computing device is programmed to output said second limiter control signal upon start up of the engine.

4. A fuel control system as defined in claim 2 wherein said computing device includes at least one engine modeling circuit and wherein thrust related parameters for generating said second limiter control signals are generated.

5. The fuel control system of claim 3 in which said computing device is programmed not to produce said second limiter control signal if the thrust demanded from the engine is greater than a predetermined value immediately after engine start-up.

6. The fuel control system of claim 1 wherein said second limiter control signal includes means for generating a control signal to said overspeed limiter to lower the threshold at which said overspeed limiter is set to operate.

7. The fuel control system of claim 1 further comprising means responsive to said second limiter control signal for minimizing said transducer signal output at a level indicating a false value of said thrust related parameter which indicates an oversupply of fuel to the engine.

* * * * *